United States Patent [19]

Tsuruoka et al.

[11] Patent Number: 5,081,524
[45] Date of Patent: Jan. 14, 1992

[54] IMAGE INPUTTING DEVICE FOR ENDOSCOPE

[75] Inventors: Takao Tsuruoka, Hachioji; Yutaka Konomura, Tachikawa, both of Japan

[73] Assignee: Olympus Optical Co., Ltd., Tokyo, Japan

[21] Appl. No.: 483,303

[22] Filed: Feb. 21, 1990

Related U.S. Application Data

[63] Continuation of Ser. No. 195,734, May 16, 1988, abandoned.

[30] Foreign Application Priority Data

May 22, 1987 [JP] Japan .................. 62-123768

[51] Int. Cl.⁵ .......................................... H04N 9/69
[52] U.S. Cl. ............................ 358/32; 358/98; 358/22
[58] Field of Search ............... 358/32, 164, 22, 98

[56] References Cited

U.S. PATENT DOCUMENTS

| | | | |
|---|---|---|---|
| 2,660,613 | 11/1953 | Young | 358/29 C |
| 3,461,224 | 8/1969 | McMann | 358/32 |
| 3,735,026 | 5/1973 | Smith et al. | 358/29 C |
| 4,396,938 | 8/1983 | Dischert | 358/32 |
| 4,489,349 | 12/1984 | Okada | 358/168 |
| 4,667,228 | 5/1987 | Kawamura et al. | 358/32 |
| 4,737,842 | 4/1988 | Nagasaki | 358/28 |

FOREIGN PATENT DOCUMENTS

| | | | |
|---|---|---|---|
| 1201799 | 3/1986 | Canada | 358/32 |
| 88583 | 9/1983 | European Pat. Off. | 358/22 |
| 126423 | 10/1979 | Japan | 358/22 |

*Primary Examiner*—John W. Shepperd
*Attorney, Agent, or Firm*—Armstrong, Nikaido, Marmelstein, Kubovcik, & Murray

[57] ABSTRACT

An image inputting device for an endoscope is provided in which image obtained by the endoscope and decomposed into a plurality of color signals is converted into electrical signals. A gray scale correcting section having an adjustable correcting value is provided for each of the plurality of color signals. In consequence, the gray scales of the plurality of color signals can be separately and adjustably corrected, and a resolution which corresponds to the luminance level of each color can be set so as to enable effective information to be easily obtained from all wavelength regions.

2 Claims, 7 Drawing Sheets

LUMINANCE LEVEL OF OBJECT     DIGITAL OUTPUT VALUE

LUMINANCE LEVEL OF OBJECT     DIGITAL OUTPUT VALUE

IMAGE INPUTTING DEVICE FOR ENDOSCOPE

This application is a continuation of application Ser. No. 195,734, filed May 16, 1988, now abandoned.

BACKGROUND OF THE INVENTION

1. Field of the Invention

The present invention relates to an image inputting device for an endoscope which is capable of providing effective information from overall wavelength regions.

In the known type of endoscope for providing color images which utilizes the field sequential color television method, the light of three primary colors such as red, green and blue is sequentially irradiated onto an object such as an organism, and the reflected light of individual colors is received by an imaging device such as a CCD where it is converted into an electrical signal. After the thus-obtained picture signals are stored in memories in succession, they are converted into color television signals by a processor to be displayed on a color monitor. This type of color endoscope utilizing the field sequential method was proposed, for example, in the specification of U.S. Pat. No. Re. 31290.

Image inputting devices of a type that can be used in the above-described color endoscopes were proposed, for example, in the specification of Japanese Patent Application No. 61-207432. This image inputting device has a structure of the type shown in FIG. 1. More specifically, the image inputting device is made up of: a CCD 101 for providing images of the observed part of an organism, the CCD 101 being located at the end of an inserted section of the endoscope; an amplifier 102 for amplifying the output signal of the CCD 101; a gamma correcting section 103; an analog/digital converter 104; a switch-over switch 105; image memories 106, 107, and 108 connected to the output of the switch-over switch 105 for storing red, green, and blue color picture signals; digital/analog converters 109, 110, and 111 respectively connected to the image memories 106, 107, and 108; and a control signal generating section 112 respectively connected to the analog/digital converter 104, the switch-over switch 105, the image memories for red, green, and blue color picture signals 106, 107, and 108, the digital/analog converters 109, 110, and 111, a synchronizing signal generating circuit 113, and a motor 115 for driving red, green, and blue rotary filters 114. Light from a lamp 116 serving as a light source is irradiated onto the end surface of a light guide 117 through the filters 114, and is led to the forward end of the inserted section of the endoscope through the light guide 117 for illuminating the observed part utilizing the field sequential color television method.

In the thus-arranged image inputting device for an endoscope, the light illuminated from the lamp 116 is decomposed into the three primary colors of red, green, and blue by the rotary filters 114, and the light of these three primary colors is sequentially made incident upon the light guide 117 to irradiate the organism. Visual image information on the organism is converted by the CCD 101 into electrical signals, and these picture signals are input to the amplifier 102 where they are amplified to a predetermined voltage level. The amplified picture signals then enter the gamma correcting section 103 where they are gamma corrected. After the gamma corrected picture signals have been converted into digital signals by the analog/digital converter 104, they enter the switch-over switch 105, and are then sequentially recorded in the red, green, and blue image memories 106, 107, and 108, being changed over by the switch-over switch 105 which is driven by control signals. The picture signals contained in the red, green, and blue image memories 106, 107, and 108 are sequentially read out by the control signals from the control signal generating section 112, and are converted into analog signals by the corresponding digital/analog converters 109, 110, and 111. Thereafter, the analog picture signals are fed out to red, green, and blue picture signal output terminals together with the synchronizing signals from the synchronizing signal generating circuit 113. The thus-obtained red, green, and blue picture signals are presented to a TV monitor for observation of the image provided by the endoscope.

In the above-described image inputting device for an endoscope, a common gamma correcting section is adopted for the red, green, and blue color signals, and these signals are therefore gamma corrected using a non-adjustable output-input characteristic.

However, when the three primary color signals are gamma corrected using a common output-input characteristic in the above-described manner, reproduction of the image obtained by the endoscope is caused to deteriorate in the manner described below: generally, the luminance level of the red component of the object observed by the endoscope is high, and that of the blue component is low, as shown in FIG. 2. Therefore, in gray histograms of the luminance levels of the range shown in FIG. 2 in which the luminance levels are respectively digitized (in an 8-bit, for example) for the red, green and blue colors, the gray levels of the red and blue colors deviate, as shown in FIGS. 3A, 3B, and 3C.

This means that if the red, green, and blue color signals are gamma corrected with the same gamma correcting section by employing the same output-input characteristic, any deviations that take place in the luminance levels of the colors of the object appear in the output color signals. In this case, as shown in FIG. 3A, the red color signal is shifted toward a high level, and is therefore susceptible to saturation. On the other hand, the blue color signal is shifted toward a low level, and is therefore susceptible to being buried in noise, as shown in FIG. 3C.

In such an image reproducing state, since the gray histograms of the primary color signals which are obtained after they have been gamma corrected do not match the luminance levels of the primary colors of the object, the amount of effective information associated with the original image is decreased. Further, since the red color signal deviates toward the high level, signals having a very low level are masked, making discrimination of them difficult.

SUMMARY OF THE INVENTION

The present invention is directed to overcoming the above-described problems of the prior art, and its object is to provide an image inputting device for an endoscope which enables even signals having a very low luminance level to be easily discriminated and which enables the effective information to be obtained from overall wavelength regions.

To this end, the present invention provides an image inputting device for an endoscope which converts visual image information provided by the endoscope and decomposed into a plurality of color signals into electrical signals, the image inputting device being characterized by the inclusion of a gray scale correcting section employing an adjustable correction value for each of the plurality of color signals.

With this arrangement, the gray scales of the plurality of color signals can be separately and adjustably corrected so that the gray histograms obtained after the correction of the gray scales of the plurality of color signals match the luminance levels of these colors with respect to the object. In this application, "gray scale" refers to the gradation of a gray level. In consequence, deviation of the gray level in each color signal can be prevented, and effective information can be obtained from overall wavelength regions.

DESCRIPTION OF THE PREFERRED EMBODIMENTS

Figure 1:
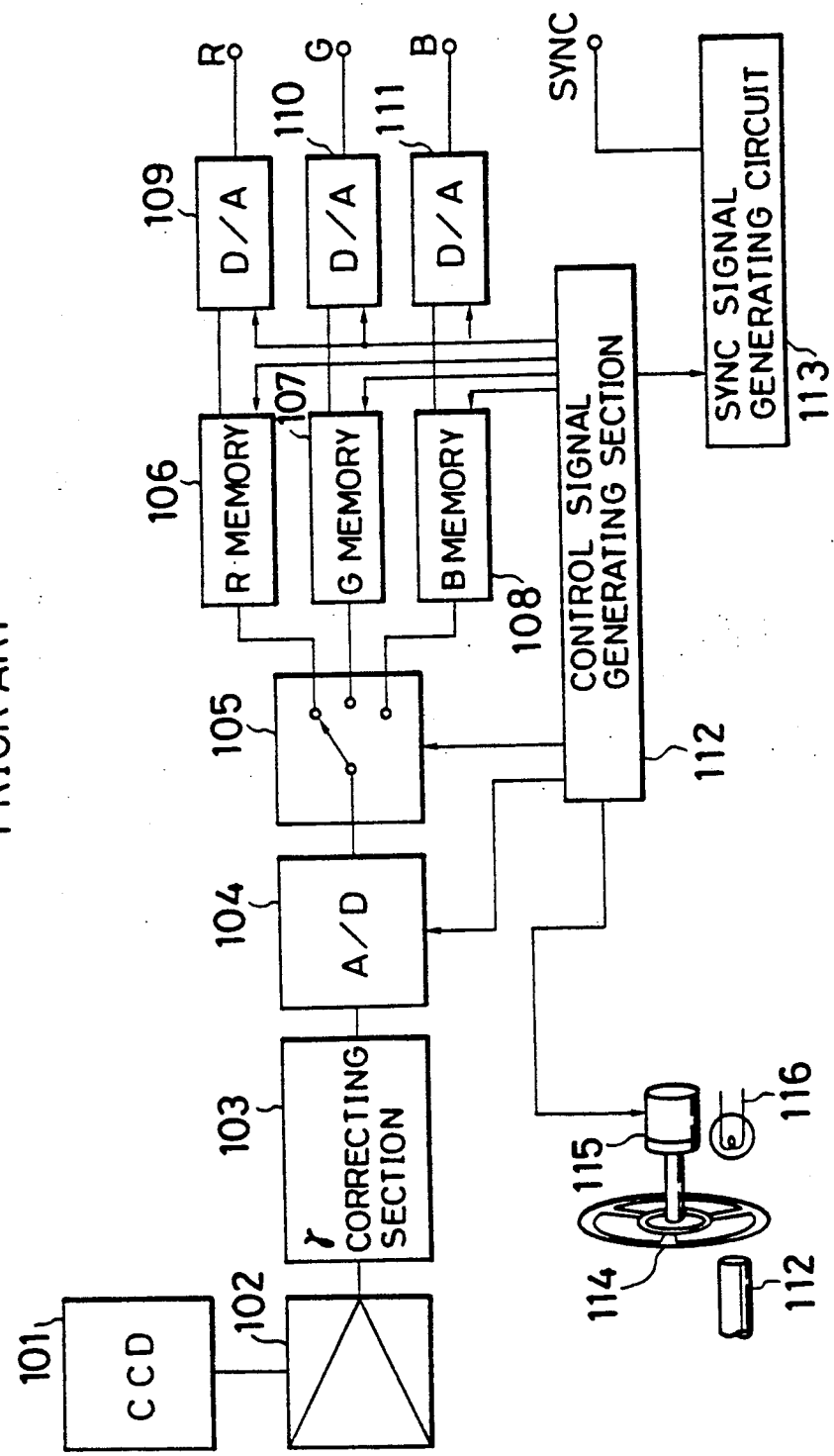
FIG. 1 is a block diagram of a known image inputting device for an endoscope.
Figure 2:
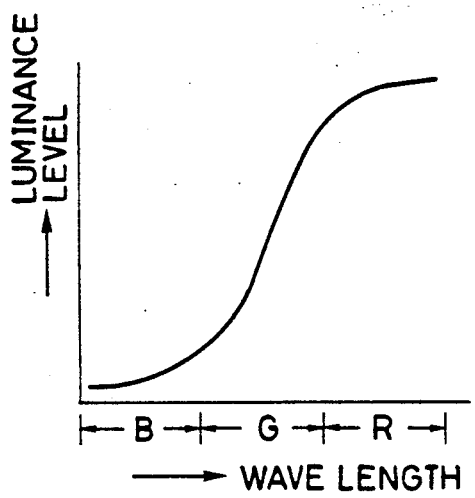
FIG. 2 illustrates the luminance level of an image obtained by the endoscope.
Figure 3A:
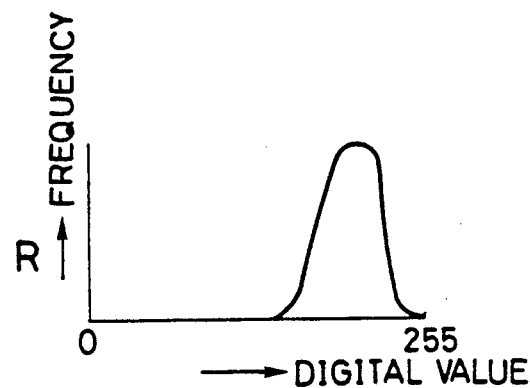
FIGS. 3A, 3B, and 3C are histograms of digitized output signals of red, green, and blue colors.
Figure 3B:
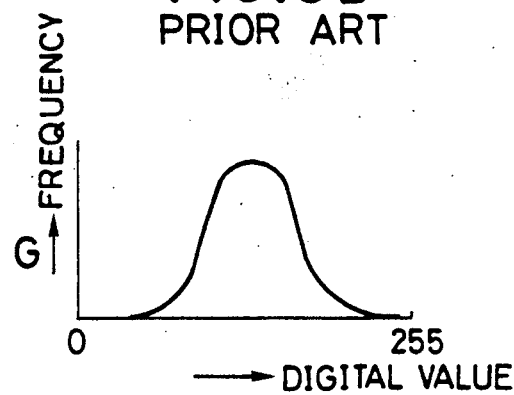
Figure 3C:
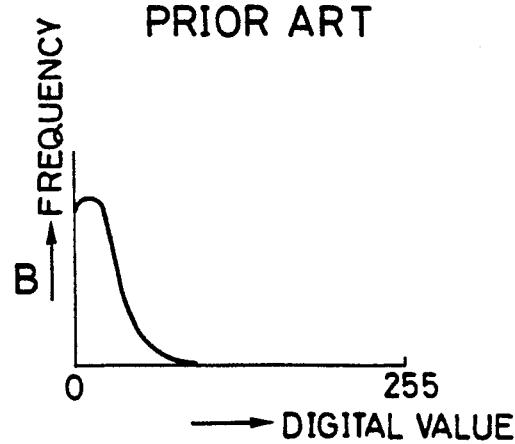
Figure 4:
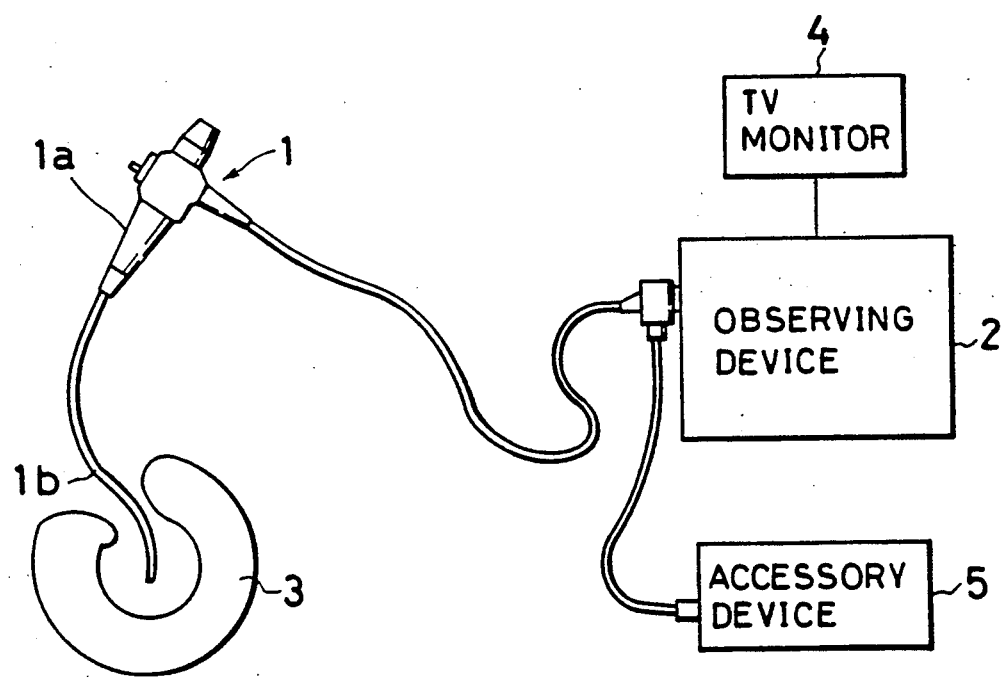
FIG. 4 is a schematic view of an endoscope to which an image inputting device for an endoscope of the present invention can be applied.

Embodiments of the present invention are described below with reference to the accompanying drawings. Referring first to FIG. 4 which schematically shows an example of an endoscope to which an image inputting device for an endoscope according to the present invention is applied, an endoscope 1 has an endoscope body 1a connected to an observing device 2 incorporating an image inputting device, and an inserted section 1b which is inserted into a cavity of an organism 3. A TV monitor 4 used for observing the image is connected to the observing device 2, and an accessory device 5 such as an evacuator is connected to the endoscope body 1a. Illumination light is supplied to the forward end of the inserted section 1b, and the visual image information obtained by irradiating the light onto the organism 3 is converted into electrical signals by an imaging device such as a CCD disposed at the forward end of the inserted section 1b. The electric signals are then processed into TV signals by the observing device 2 to be displayed on the TV monitor 4 for observation.

Figure 5:
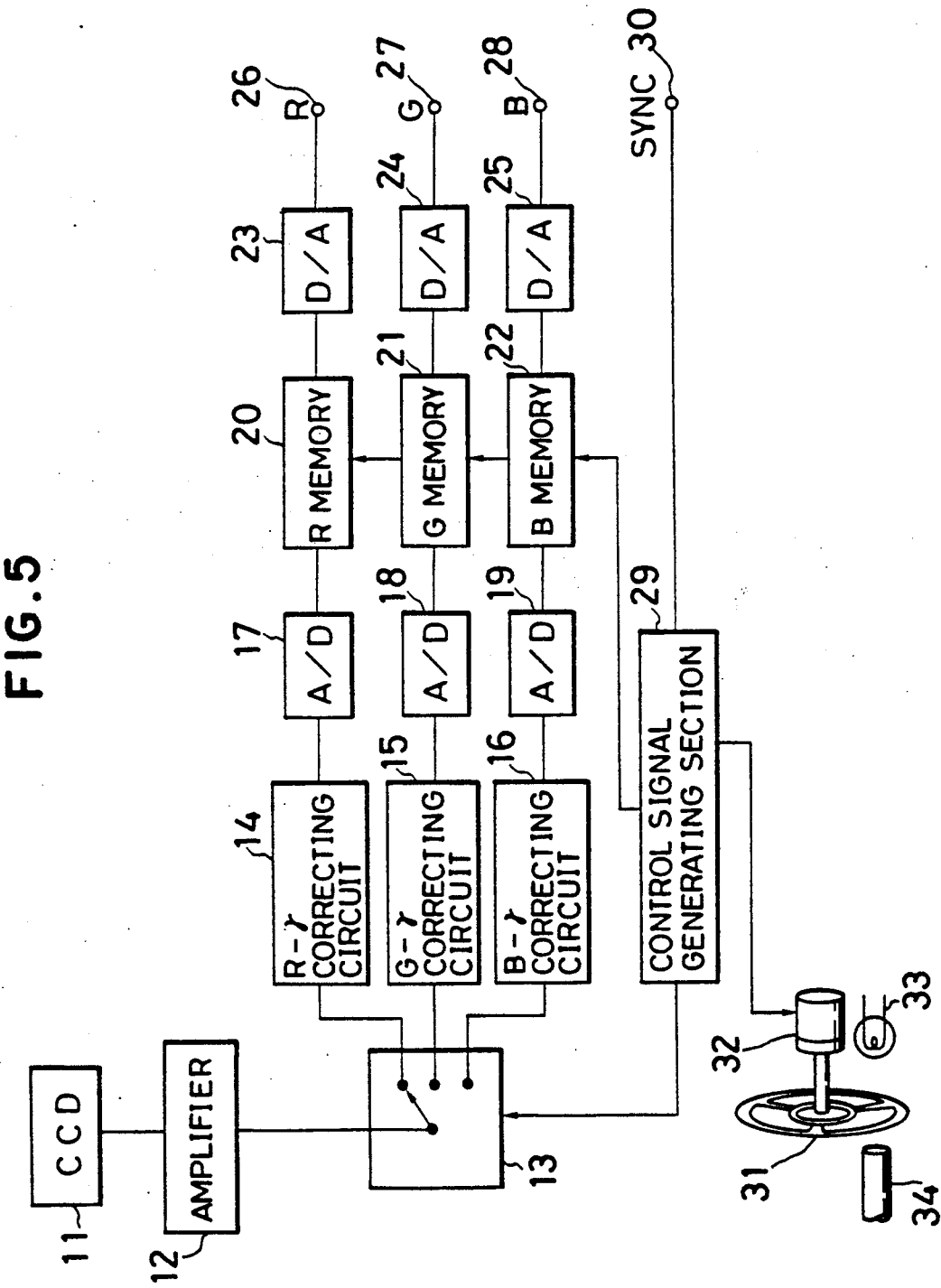
FIG. 5 is a block diagram of a first embodiment of the present invention.

FIG. 5 is a block diagram of a first embodiment of an image inputting device for an endoscope according to the present invention. Image information on the organism 3 is converted into electrical signals by a CCD 11 disposed on the forward end of the inserted section 1b of the endoscope 1. The output signals from the CCD 11 are input to an amplifier 12, then to a switch-over switch 13. The switch-over switch 13 has three output terminals respectively connected to a gamma correcting circuit 14 for red signals, a gamma correcting circuit 15 for green signals, and a gamma correcting circuit 16 for blue signals.

The characteristics of the gamma correcting circuits 14, 15, and 16 can be separately adjusted. The output signals from the gamma correcting circuits are respectively input to analog/digital converters 17, 18, and 19. The output signals of the analog/digital converters 17, 18, and 19 are respectively input to a red image memory 20, a green image memory 21, and a blue image memry 22. The image memories 20, 21, and 22 are respectively connected to digital/analog converters 23, 24, and 25 whose output terminals are in turn connected to picture signal output terminals 26, 27, and 28, respectively.

A control signal generating section 29 is adapted to generate various types of control signals including a signal for controlling the destination of transfer of picture signals and that of controlling transfer timings of picture signals, and is connected to the switch-over switch 13 and the red, green, and blue image memories 20, 21, and 22. It also has a function of outputting to a synchronizing signal terminal 30 synchronizing signals for the picture signals output to the picture signal output terminals 26, 27, and 28. Furthermore, the control signal generating section 29 is also connected to a motor 32 for driving a red, green, and blue rotary filter 31 so as to apply control signals thereto. The light irradiated from a lamp 33 which serves as a light source is made incident upon a light guide 34 through the red, green, and blue rotary filter 31, and is then led therethrough to the forward end of the inserted section 1b of the endoscope.

Next, the operation of the thus-arranged image inputting device of the endoscope will be described. As the motor control signal is applied from the control signal generating section 29 to the motor 32 for driving the red, green, and blue rotary filter 31, the motor 32 rotates the red, green, and blue rotary filter 31 at predetermined timings. The light illuminated by the lamp 33 is decomposed into red (R), green (G), and blue (B) primary colors by the rotation of the red, green, and blue rotary filter 31 and are made incident upon the light guide 34 of the endoscope 1 so as to irradiate the organism 3 by what is called RGB field sequential color television method.

Visual image information on the organism 3 illuminated by the three primary colors is converted into electrical picture signals by the CCD 11, and the converted picture signals are amplified by the amplifier 12 to a a voltage level within a predetermined range, e.g., to a voltage ranging between 0 V and 1 V. The amplified picture signals are respectively input to the gamma correcting circuits 14, 15, and 16 for the R, G, and B color signals through the switch-over switch 13 which is changed over in synchronism with the timing at which the RGB rotary filter 31 is rotated by the control signal from the control signal generating section 29. More specifically, the picture signal representing the image information accepted by the CCD 11 while the red (R) light is illuminated onto the object is input to the gamma correcting circuit 14 for the R signal, the picture signal representing the image information obtained by the illumination of the green (G) light is input to the gamma correcting circuit 15 for the G signal, and the picture signal representing the image information obtained by the illumination of the blue (B) light is input to the gamma correcting circuit 16 for the B signal, the red (R), green (G), and blue (B) color signals being input to their respective gamma correcting circuits in that order. Each of the R, G, and B color signals is converted by the corresponding gamma correcting circuit 14, 15, or 16 into picture signal having a predetermined gamma characteristic, i.e., represented by a predetermined gray histogram.

The gamma corrected R, G, and B picture signals are respectively quantized in, for example, an 8-bit by the analog/digital converters 17, 18, and 19. The R, G, and B picture signals which have been digitized in an 8-bit, are respectively recorded in the R, G, and B image memories 20, 21, and 22. The image memories 20, 21, and 22 each have separate input and output portions so as to enable input and output operations to be conducted at separate timings.

The R, G, and B picture signals stored in the image memories 20, 21, and 22 are respectively transferred by the control signal from the control signal generating section 29 to the digital/analog converters 23, 24, and 25 where they are converted into analog signals. The analog R, G, B picture signals are respectively output to the R, G, and B picture signal output terminals 26, 27, and 28 together with the synchronizing signals output to the synchronizing signal output terminal 30 from the control signal generating section 29.

Figure 6A:
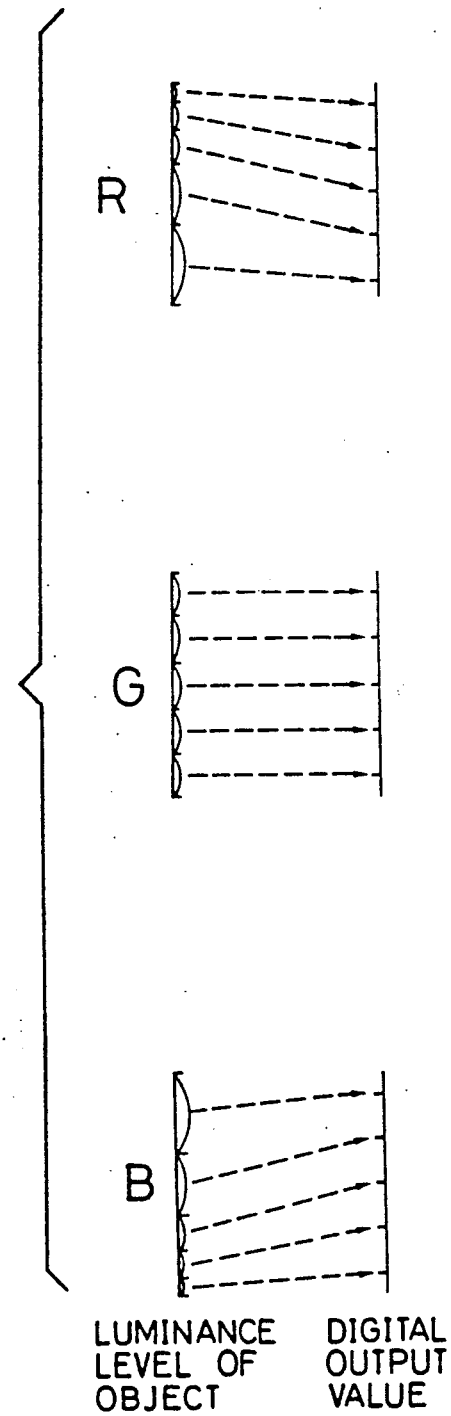
FIG. 6A shows the relationship between the luminance level of each color of the object and the corresponding digital output, obtained in the first embodiment.

Thus, the three color signals which constitute the picture signal can be separately and adjustably gamma corrected in the corresponding gamma correcting circuits 14, 15, and 16 for the R, G, and B signals. As a result, the quantization characteristics of the luminance levels of the red (R) and blue (B) components of the object can be thereby changed, as shown in FIG. 6A. More specifically, as has been described previously, since the luminance level of the red component of the object observed by the endoscope is generally high, a correcting circuit having a large gamma value is adopted for the R signal so as to provide an output signal in which the high level portion of the R signal is expanded, the output signal of the gamma correcting circuit being then quantized. As a result, the quantization characteristic of the luminance level of the R signal can be changed, and the gray level of the high luminance level portion is thereby divided into smaller ranges so as to improve the resolving power at the high level portion. However, in the case of B signal, the luminance level of the blue component of the object is generally low. Therefore, a correcting circuit having a i.e., less than the gamma value for the R signal is employed for the B signal to provide an output signal in which the low level portion thereof is emphasized, the output signal of the correcting circuit being then quantized. As a result, the quantization characteristic of the luminance level of the B signal is changed, and the gray level of the low luminance portion is divided into smaller ranges so as to improve the resolution at the low level portion.

Thus, in this embodiment, the color signals are separately corrected in correspondence with the luminance levels of these colors in the object, and the gray histograms of these colors obtained after they have been corrected are thereby made to match the luminance levels thereof. In consequence, deviation of the gray level that occurs in each signal can be eluminated, and the effective information can be obtained from overall wavelength areas.

Figure 6B:
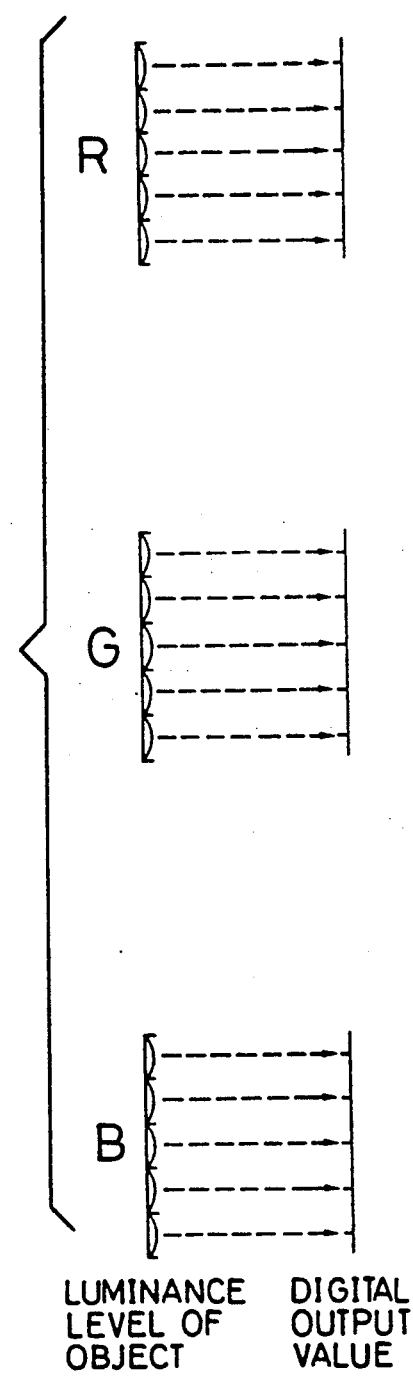
FIG. 6B shows the relationship between the luminance level of each color of the object and the corresponding digital output, obtained in the known device.

FIG. 6B show the relationship between the luminance levels of the colors in the object and the corresponding digital output values in a case wherein the color signals are gamma corrected by the common gamma correcting circuit.

Figure 7:
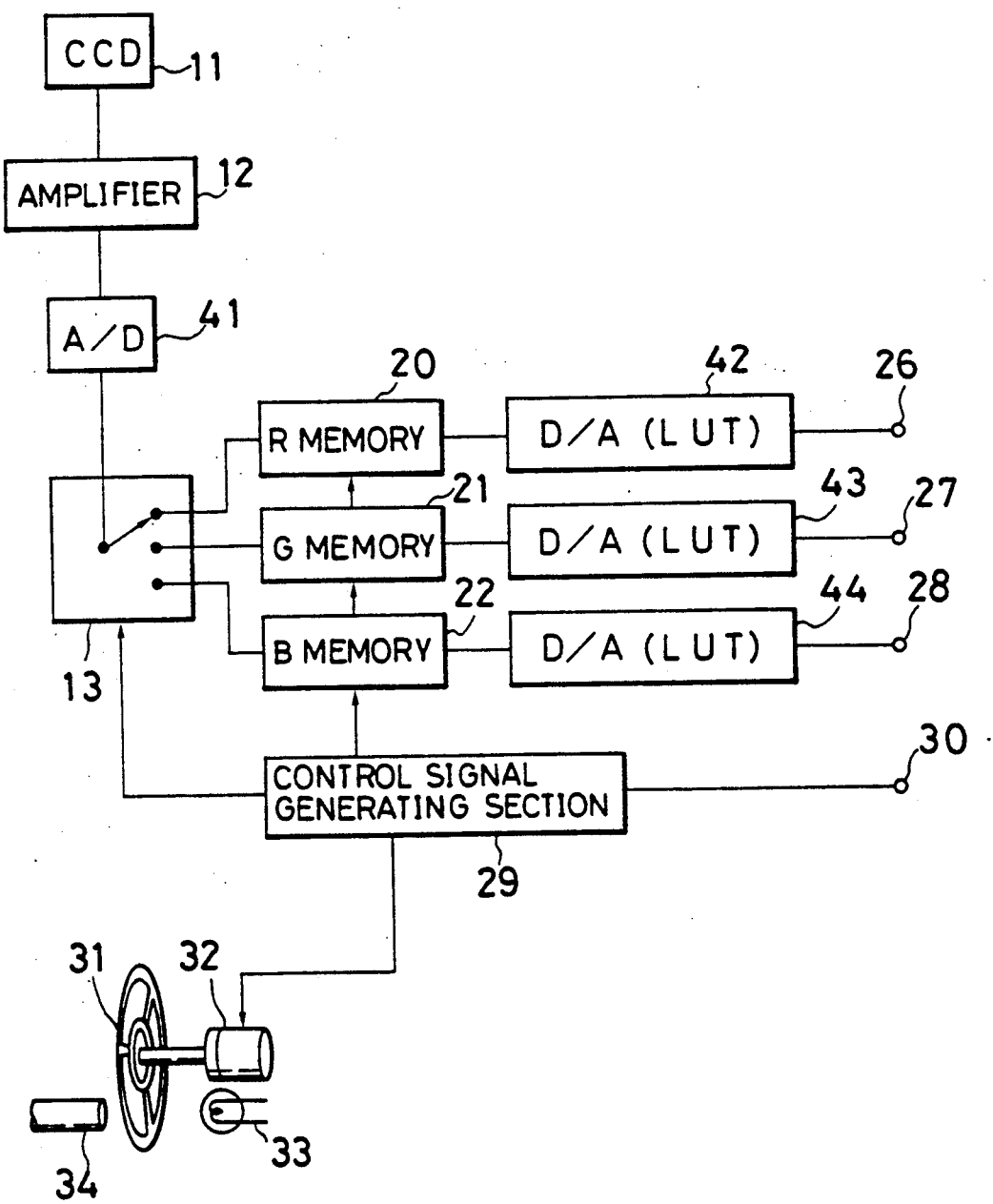
FIG. 7 is a block diagram of a second embodiment of the present invention.

FIG. 7 is a block diagram of a second embodiment of the present invention. The same reference numerals are used to denote the parts which are the same as those in the first embodiment shown in FIG. 5. This embodiment employs, in place of the gamma correcting circuits for the RGB color signals employed in the first embodiment, digital/analog converters 42, 43, and 44 which are respectively connected to the RGB image memories 20, 21, and 22 and each of which incorporates a look up table for transforming the picture signal into that having a predetermined gamma characteristic. These look up tables are each arranged such that their characteristics can be separately adjusted. The above-described arrangement of the second embodiment allows it to use a common analog/digital converter 41 and the switchover switch 13 to be disposed subsequent to the analogy/digital converter 41. The other structure is the same as that of the first embodiment.

The operation of the thus-arranged second embodiment will now be described. As in the first embodiment, the light illuminated from the lamp 33 is decomposed into R, G, and B three primary colors by the rotation of the RGB rotary filter 31, and the decomposed color light are made incident upon the light guide 34 so as to illuminate the organism 3 by the RGB field sequential color TV method. The image information of the organism 3 illuminated by the three primary color lights is converted into electrical picture signals by the CCD 11. After the picture signals are amplified by the amplifier 12 to a voltage level within a predetermined range, the amplified picture signals are fed to the analog/digital converter 41 where they are quantized. The digital picture signals are sequentially and respectively recorded in the RGB image memories 20, 21, and 22 through the switch-over switch 13 which is changed over in synchronism with the timing at which the RGB rotary filter is rotated by the control signal from the control signal generating circuit 29.

The picture signals recorded in the RGB image memories 20, 21, and 22 are transferred by the control signal from the control signal generating section 29 to the digital/analog converters 42, 43, and 44. Since each of the digital/analog converters 42, 43, and 44 incorporates a look up table for transforming the corresponding color picture signal into a picture signal having a predetermined gamma characteristic, the input digital picture signal is converted into an analog signal having a predetermined gamma characteristic. Thereafter, the analog picture signals are output to the RGB image output terminals 26, 27, and 28 together with the synchronizing signal from the control signal generating section 29.

Thus, the three color signals that constitute the picture signal and are output from the RGB image memories 20, 21, and 22 are corrected such that the resultant picture signals have separate gamma characteristics in the digital/analog converters 42, 43, and 44 each of which incorporates the look up table. As a result, the input-output characteristics of the red (R) and blue (B) components of the object can be changed, as shown in FIG. 8A, and the resolution of part of each of the red and blue signals can be thereby increased.

Figure 8A:
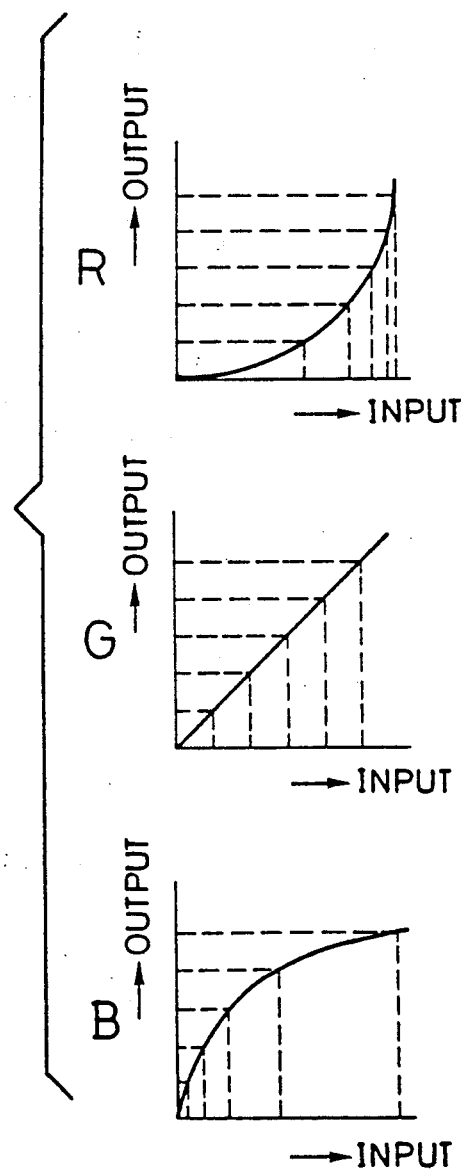
FIG. 8A illustrates the input-output characteristic of each color signal in the second embodiment.

More specifically, the input-output characteristic of the red signal can be changed in the manner shown in FIG. 8A, by which the resolution of the high level portion thereof can be increased. Further, the input-output characteristic of the blue signal is changed in the manner shown in FIG. 8A so as to increase their resolution of the low level portion thereof. In consequence, the color signals can be corrected in correspondence with the luminance levels of these colors in the object, and deviation of gray level that occurs in the R and B signals can be thereby eliminated.

Figure 8B:
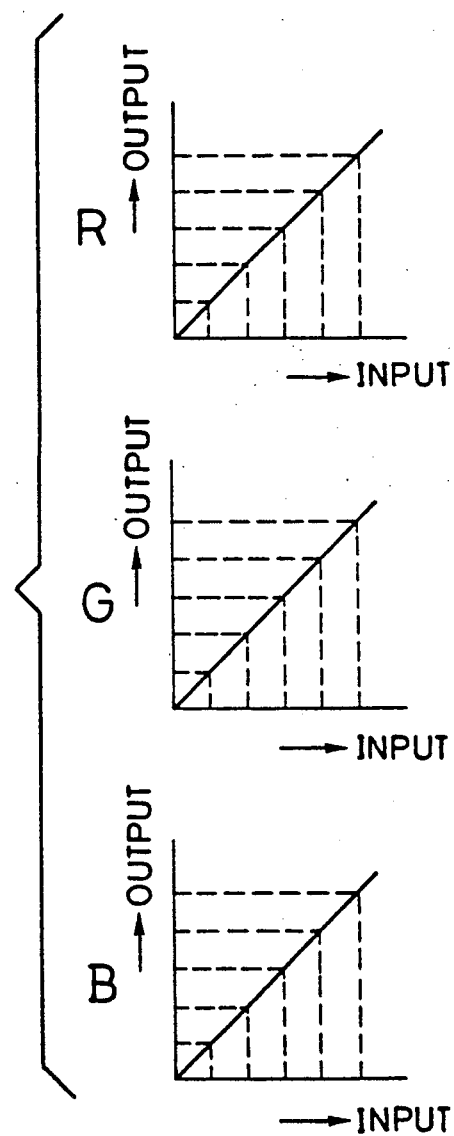
FIG. 8B illustrates the input-output characteristic of each color signal in the known device.

FIG. 8B show the input-output characteristics of the three colors obtained in the known image inputting device in which these color signals have the same input-output characteristics so as to provide a uniform resolution in overall levels.

Each of the above-described embodiments employs R, G, and B three primary color signals as the plurality of color signals. However, the present invention is not limited to these three primary colors, and can also be applied to complementary colors of cyan (C), magenta (M), and yellow (Y).

In the present invention, since the gamma characteristics of the plurality of color signals are separately corrected, i.e, the gray histograms of the plurality of color signals are separately corrected, an optimum image processing of the resultant color signals is enabled. However, this allows the original image to be ill-color balanced, and prevents it from being presented on a TV monitor in natural colors. If it is desired that the image is also displayed in natural colors, means for modifying gray scale of each color signal using a gamma characteristic which is inverse to that set for gamma correction must be incorporated.

As will be understood from the foregoing description, in the present invention, a correcting section having an adjustable characteristic is provided for each of the plurality of digital or analog color signals that constitute the image obtained by the endoscope so as to transform it into a picture signal having a predetermined gamma characteristic which corresponds to the luminance level of the color in the object. Therefore, the resolution of each of the color signals can be set in correspondence to the luminance level thereof, and the gray histogram of each of the color signals obtained after they have been gamma corrected can be thereby made to match the luminance level thereof. In consequence, deviation of the gray level that occurs in each color signal can be eliminated, and the effective information can be easily provided from overall wavelength regions.

What is claimed is:

1. A method of correcting color signals in an endoscope in correspondence to respective luminance levels of said color signals, said method comprising the steps of:

separating signals of an image obtained in said endoscope into three primary color signals R, G and B;

converting said primary color signals into electrical signals;

correcting all luminance levels of an R signal with a gamma value;

correcting all luminance levels of a B signal with a gamma value which is less than the gamma value of said R signal;

correcting all luminance levels of a G signal with a gamma value that is less than the gamma value of said R signal and more than the gamma value of said B signa; and correcting said image in said endoscope using said gamma values of said R, B and G signals.

2. A method of correcting color signals in an endoscope in correspondence with respective luminance levels of said color signals, said method comprising the steps of:

separating signals of an image obtained in said endoscope into three primary color signals R, G and B;

converting said primary color signals into electrical signals;

using an input-output characteristic which improves resolution in a high level portion for all luminance levels of an R signal;

using an input-output characteristic which improves resolution in a low level portion for all luminance levels of a B signal;

using a linear input-ouput characteristic for all luminance levels of a G signal; and correcting said image in said endoscope using said input-output characteristics of said R, B and G signals.

* * * * *